(12) United States Patent
Harte

(10) Patent No.: US 10,537,792 B1
(45) Date of Patent: Jan. 21, 2020

(54) TOUCHSCREEN GAME MECHANIC INVOLVING SEQUENCES OF ARRANGEMENTS OF INPUT AREAS

(71) Applicant: Darien Harte, Sherman Oaks, CA (US)

(72) Inventor: Darien Harte, Sherman Oaks, CA (US)

( * ) Notice: Subject to any disclaimer, the term of this patent is extended or adjusted under 35 U.S.C. 154(b) by 0 days.

(21) Appl. No.: 15/646,016

(22) Filed: Jul. 10, 2017

Related U.S. Application Data

(60) Provisional application No. 62/360,389, filed on Jul. 10, 2016.

(51) Int. Cl.
| | |
|---|---|
| *A63F 9/00* | (2006.01) |
| *A63F 13/2145* | (2014.01) |
| *A63F 13/25* | (2014.01) |
| *A63F 13/35* | (2014.01) |
| *A63F 13/55* | (2014.01) |
| *A63F 13/44* | (2014.01) |
| *A63F 13/426* | (2014.01) |
| *G06F 3/0488* | (2013.01) |

(52) U.S. Cl.
CPC .......... *A63F 13/2145* (2014.09); *A63F 13/25* (2014.09); *A63F 13/35* (2014.09); *A63F 13/426* (2014.09); *A63F 13/44* (2014.09); *A63F 13/55* (2014.09); *G06F 3/04886* (2013.01)

(58) Field of Classification Search
None
See application file for complete search history.

(56) References Cited

U.S. PATENT DOCUMENTS

| | | | | |
|---|---|---|---|---|
| 4,216,965 | A * | 8/1980 | Morrison | A63F 9/24 463/10 |
| 9,472,178 | B2 * | 10/2016 | Kruge | A63F 13/426 |
| 9,733,754 | B2 * | 8/2017 | Moon | G06F 3/0416 |
| 2003/0116913 | A1 * | 6/2003 | Harpaz | A63F 3/00643 273/237 |
| 2005/0187023 | A1 * | 8/2005 | Miyamoto | A63F 13/10 463/43 |
| 2010/0287471 | A1 * | 11/2010 | Nam | G06F 3/011 715/702 |
| 2011/0029920 | A1 * | 2/2011 | Kang | G06F 3/0488 715/810 |
| 2011/0234503 | A1 * | 9/2011 | Fitzmaurice | G06F 3/0235 345/173 |
| 2011/0316793 | A1 * | 12/2011 | Fushiki | G06F 3/04886 345/173 |

(Continued)

OTHER PUBLICATIONS

Omiya Games. "Touch Yoga". Released Apr. 29, 2013. <https://www.omiyagames.com/portfolio/touch-yoga/> (Year: 2013).*

(Continued)

*Primary Examiner* — Seng H Lim
(74) *Attorney, Agent, or Firm* — Phil IP Law Group; Narek Zohrabyan

(57) ABSTRACT

The exemplary embodiments present a game mechanic for an electronic game playable on a computing device that has a display with a touchscreen configured to receive a plurality of touch inputs simultaneously. The graphical user interface of such a game displays a sequence of arrangements of input areas. For each such arrangement, the player must simultaneously touch some or all of the presented input areas in order to proceed to the next arrangement.

20 Claims, 23 Drawing Sheets

(56) References Cited

U.S. PATENT DOCUMENTS

| | | | | |
|---|---|---|---|---|
| 2012/0174736 A1* | 7/2012 | Wang | ................... | G10H 1/0008 84/622 |
| 2012/0274585 A1* | 11/2012 | Telfer | ................... | G06F 3/0488 345/173 |
| 2012/0274775 A1* | 11/2012 | Reiffel | ............... | G06Q 30/0241 348/158 |
| 2013/0180385 A1* | 7/2013 | Hamilton | ............. | G10H 1/0016 84/603 |
| 2013/0316813 A1* | 11/2013 | Derome | ................... | A63F 9/24 463/31 |
| 2013/0316829 A1* | 11/2013 | Derome | ................... | A63F 9/24 463/37 |
| 2014/0349761 A1* | 11/2014 | Kruge | ................... | A63F 13/814 463/35 |
| 2015/0153887 A1* | 6/2015 | Kim | ........................ | G06F 3/044 345/173 |
| 2016/0062539 A1* | 3/2016 | Moon | ................... | G06F 3/0416 345/173 |
| 2017/0011724 A1* | 1/2017 | Cook | ..................... | G10H 1/368 |
| 2017/0337776 A1* | 11/2017 | Herring | ............... | G07F 17/3209 |
| 2018/0078857 A1* | 3/2018 | Kim | ........................ | A63F 13/44 |

OTHER PUBLICATIONS

Bartolotti, Pavel. "Fingers". Last updated on Mar. 15, 2017. < https://play.google.com/store/apps/details?id=com.gordiandice.fingers&hl=en US> Accessed Sep. 13, 2019 (Year: 2017).*

CNProg. "Multitouch Game". Last updated on Jun. 11, 2017. <https://play.google.com/store/apps/details?id=com.chimnguyen.multitouchcompetition&hl=en_US> Accessed on Sep. 13, 2019 (Year: 2017).*

Gosztyla, Sebastian. "DUAL". Released Apr. 2, 2015. < https://web.archive.org/web/20170514200939/https://www.letsdual.com/press/sheet.php?p=dual> Accessed Sep. 13, 2019 (Year: 2015).*

* cited by examiner

US 10,537,792 B1

TOUCHSCREEN GAME MECHANIC INVOLVING SEQUENCES OF ARRANGEMENTS OF INPUT AREAS

CROSS-REFERENCE TO RELATED APPLICATION

This application claims the benefit of U.S. Provisional Patent Application No. 62/360,389, filed on Jul. 10, 2016, entitled "Touchscreen game mechanic involving sequences of arrangements of input areas," which is incorporated herein in its entirety by reference.

BACKGROUND OF THE INVENTION

The present invention relates generally to electronic games and, more specifically, to a new game mechanic for a touchscreen game.

Networked gaming systems and game servers are well known in the prior art. A game server is a server that acts as the authoritative source of events in a networked system game for one or multiple players. The server transmits sufficient data about its internal state to allow its connected clients to maintain their own accurate representation of the game state for display to a single player or multiple players. The server also receives and processes input from each player. In most online gaming systems, the game server comprises one or more dedicated remote processing units configured to run logical code to serve up the games to the players, who interact with the server via clients or terminals, usually in the form of personal computers, videogame consoles, tablets, or smartphones. Game servers usually remain in communication with data storage systems, which store data used in the served games, e.g., game states, player histories, etc.

Touchscreens too are well known in the prior art. A touchscreen is an input device normally layered on the top of an electronic visual display of an information processing system. A user can give input or control the information processing system through simple or multi-touch gestures by touching the screen with a special stylus and/or one or more fingers. Touchscreens are a common and popular component in computing devices, especially portable devices. Likewise, games for computing devices with touchscreens are numerous and popular with the general public. New and entertaining game mechanics are sought after by players of such games.

SUMMARY OF THE INVENTION

The present invention discloses a game mechanic for an electronic game playable on a computing device that has a display with a touchscreen configured to receive a plurality of touch inputs simultaneously. The graphical user interface of such a game presents a sequence of displays, each containing an arrangement of input areas in two-dimensional space. These arrangements may vary in the number of input areas and/or the relative positions of the input areas on the screen. For each such display, the player must simultaneously touch some or all of the presented input areas in order to proceed to the next display. Several single-player and multiplayer game modes employing this game mechanic are also disclosed. The game mechanic disclosed herein serves to test and potentially improve the player's dexterity and reaction time.

The features described in the specification are not all-inclusive; numerous additional features will be apparent to one of ordinary skill in the art in view of the specification, drawings, and claims. The disclosed methods may be practiced according to the claims without some or all of these specific details. The language employed in the specification has been primarily selected for readability and instructional purposes, and may not have been chosen to delineate or circumscribe the disclosed subject matter.

BRIEF DESCRIPTION OF THE DRAWINGS

Various embodiments of the invention are disclosed in the following detailed description and the accompanying drawings.

DETAILED DESCRIPTION OF THE INVENTION

The following detailed description is not limited to any particular example and does not limit the invention. Instead, the scope of the invention is defined by the appended claims. Alternative embodiments of the structures and methods illustrated herein may be employed without departing from the principles described herein. Aspects of the invention may be implemented in various ways, including as a system, a process, an apparatus, or a computer program located on a computer-readable medium such as a storage medium or a computer network.

Figure 1A:
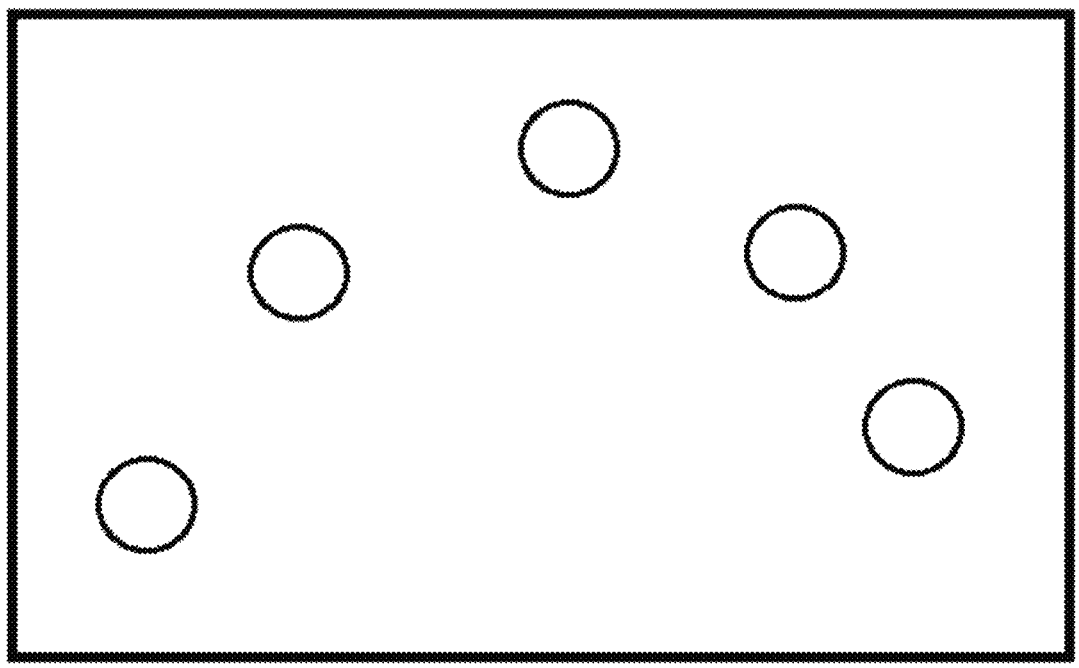
FIGS. 1A-1D show examples of arrangements of circular input areas on displays generated by the game, varying in the number and relative positions of input areas, in accordance with an embodiment.
Figure 1B:
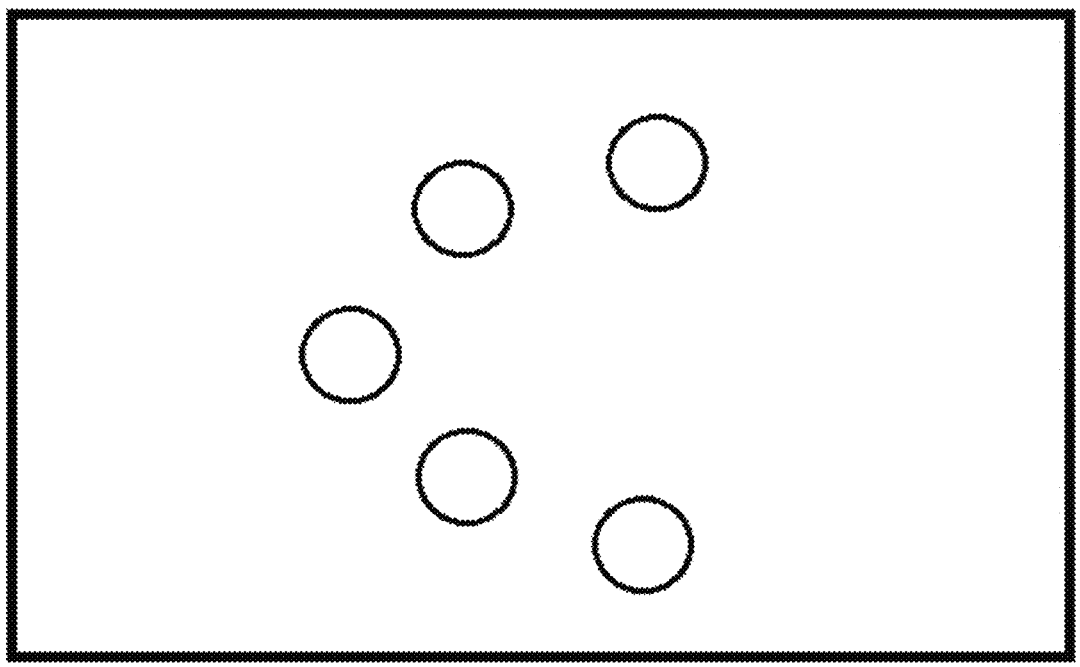
Figure 1C:
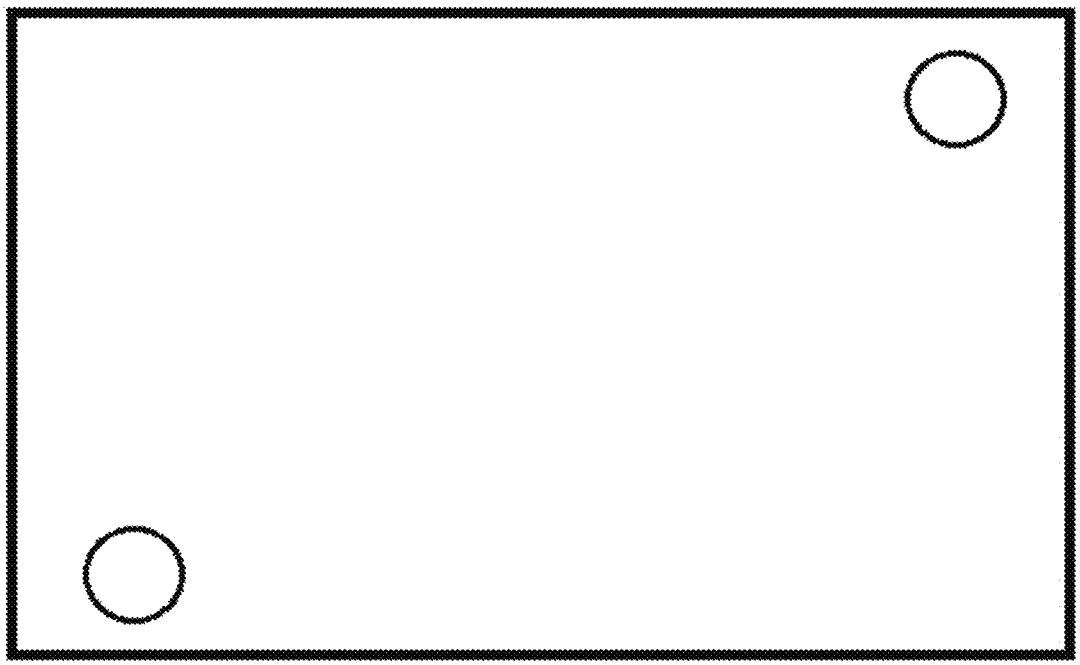
Figure 1D:
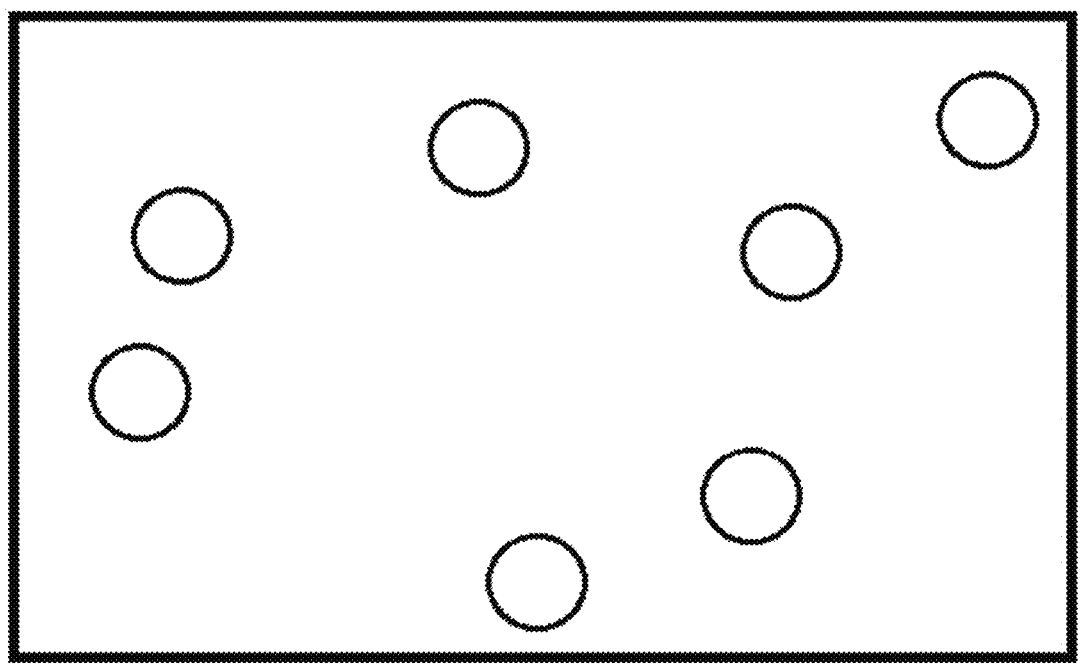
Figure 2:
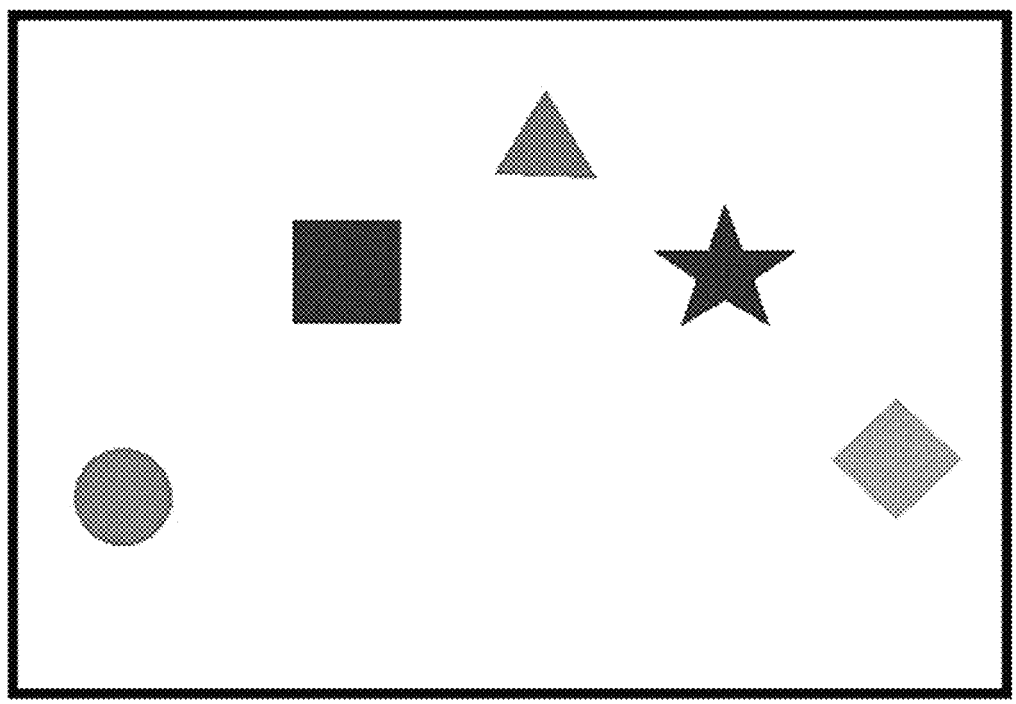
FIG. 2 shows another example of an arrangement of input areas on a display generated by the game, in accordance with an embodiment.
Figure 3A:
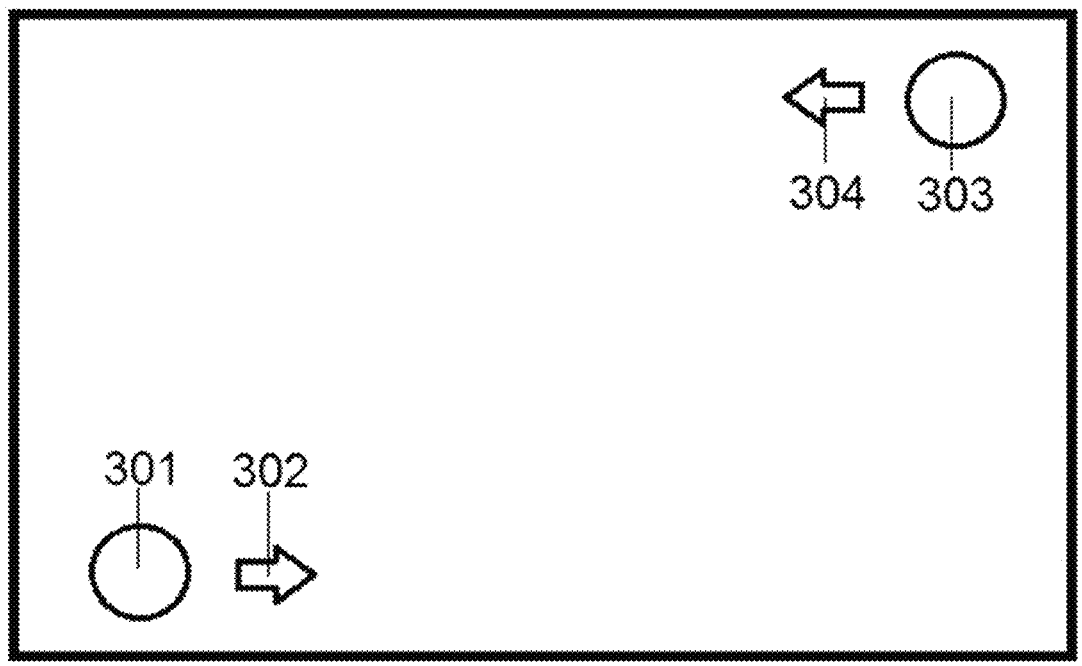
FIGS. 3A-3D show an example of a dynamic arrangement of input areas on a display generated by the game, wherein the input areas change their respective positions in a cyclical manner, in accordance with an embodiment.
Figure 3B:
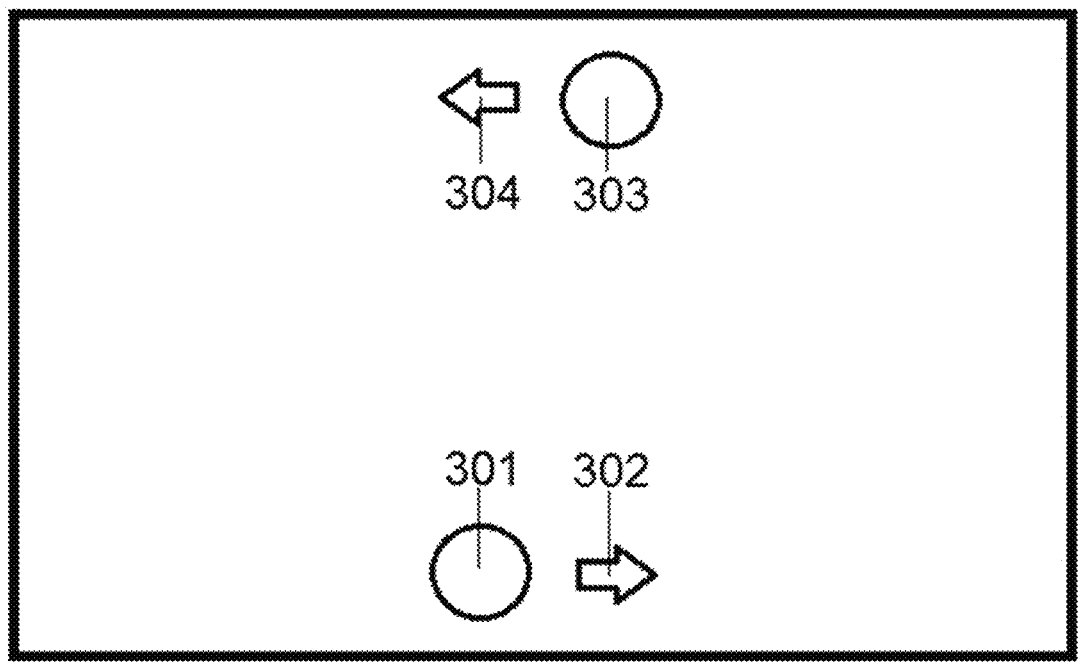
Figure 3C:
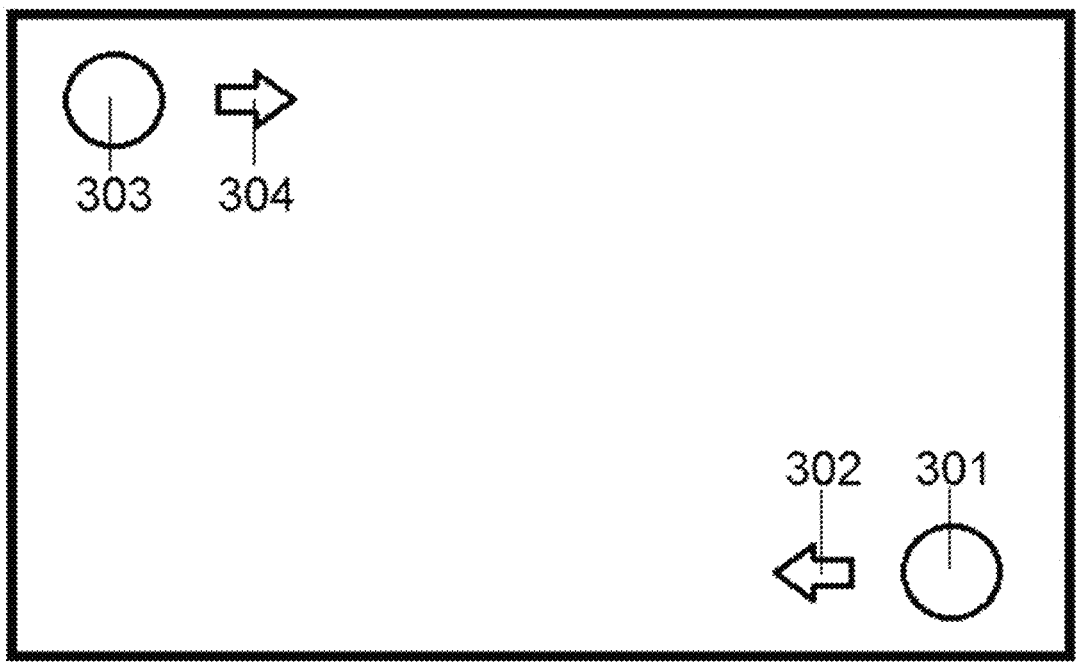
Figure 3D:
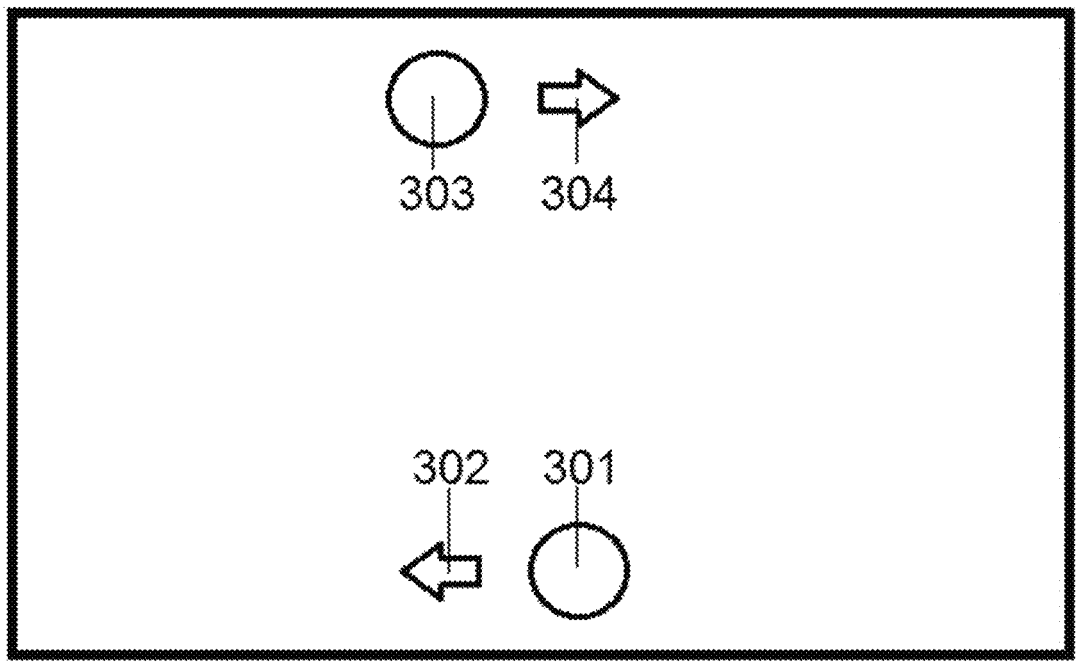
Figure 4A:
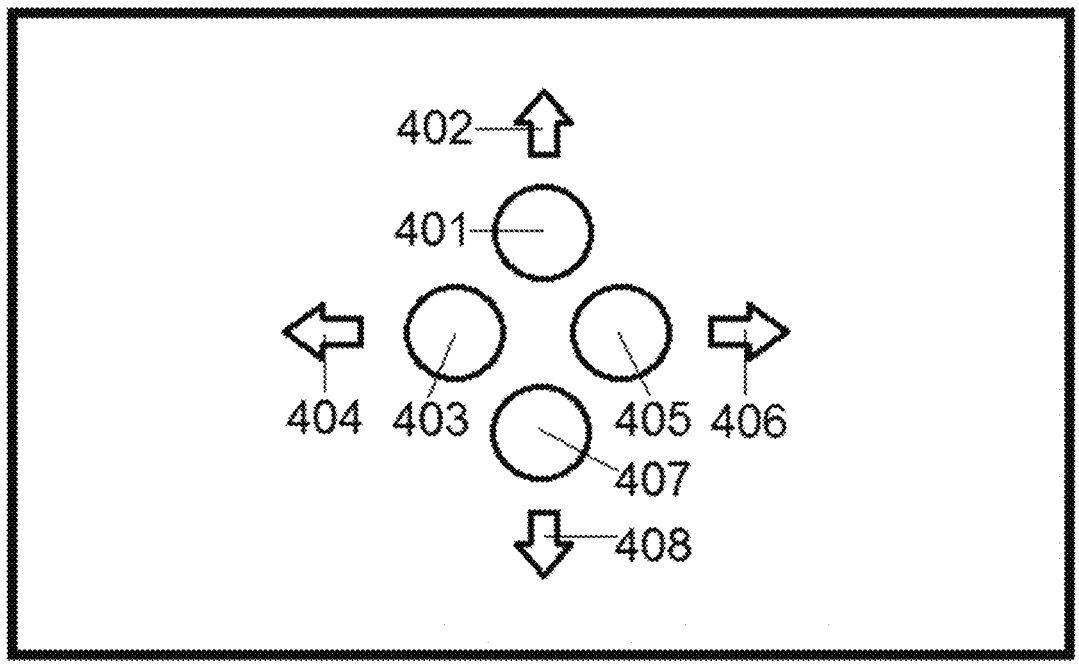
FIGS. 4A-4D show another example of a dynamic arrangement of input areas on a display generated by the game, wherein the input areas change their respective positions in a cyclical manner, in accordance with an embodiment.
Figure 4B:
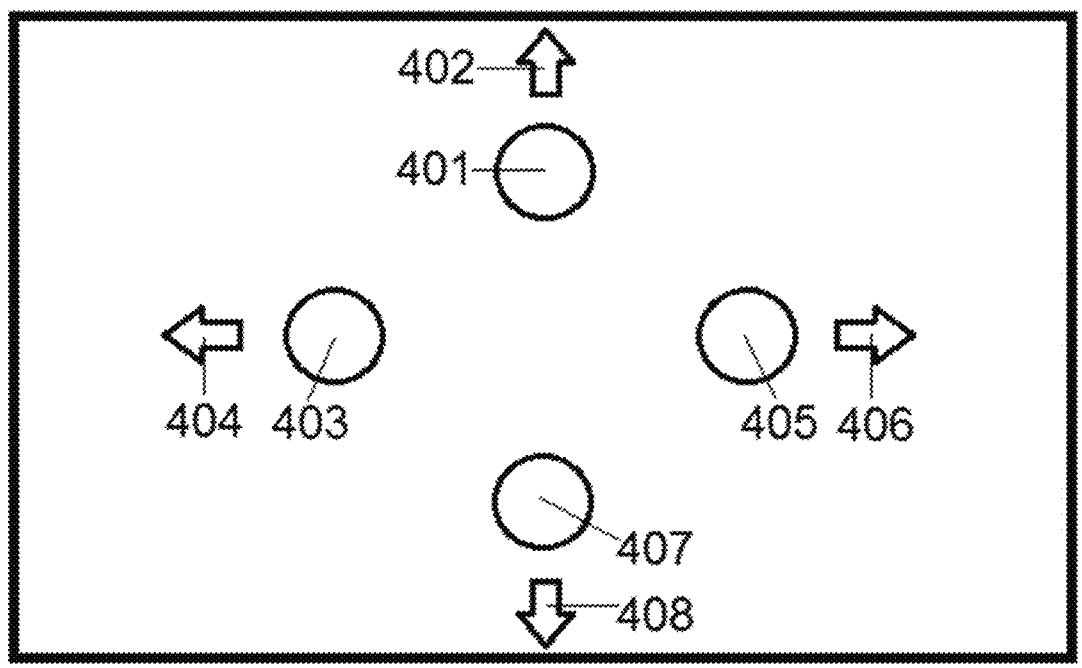
Figure 4C:
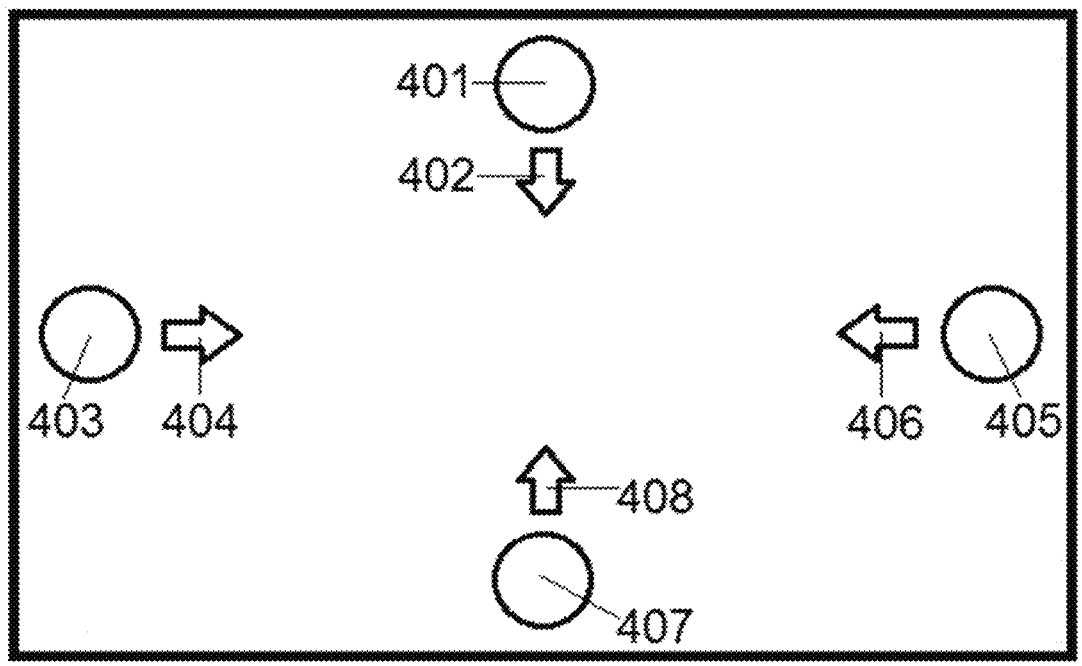
Figure 4D:
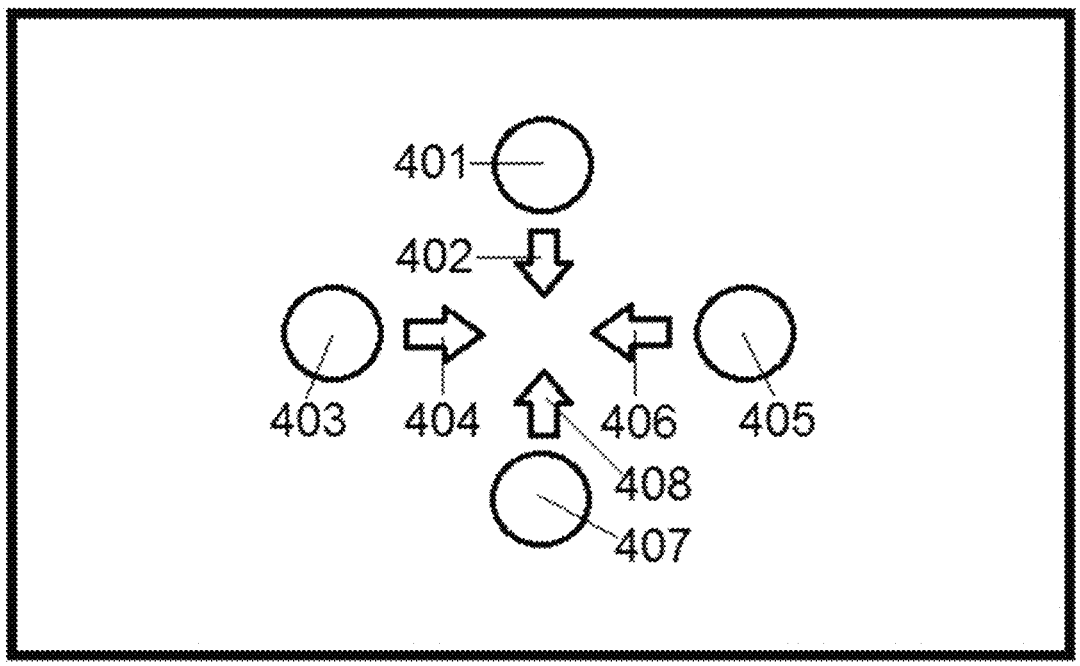

The disclosed embodiments demonstrate a game mechanic for an electronic game, comprising a sequence of displays on a touchscreen of a computing device, said displays singly containing a plurality of input areas arranged in two-dimensional space, some or all of which must be touched simultaneously by the player to proceed to the next display. FIGS. 1A-1D show examples of arrangements of circular input areas on displays generated by the game, varying in the number and relative positions of input areas, in accordance with an embodiment. FIG. 2 shows another example of an arrangement of input areas on a display generated by the game, in accordance with another embodiment. The game presents such displays in a sequence, which may be predetermined or random. For each such display, the player must simultaneously touch all of the presented input areas in order to proceed to the next display. In some embodiments, the player may place his fingers on the presented input areas one by one, holding his fingers on the touched input areas until all of them are simultaneously touched. In other embodiments, such sequential finger placement is not permitted, and all of the presented input areas must be touched at the same time. Some embodiments may require the player to simultaneously touch only some of the presented input areas in order to proceed to the next display. The number of input areas that the player must simultaneously touch to proceed to the next display may depend on the number of input areas in the presented arrangement of input areas, on the level of game difficulty selected by the player, and/or on other factors.

Figure 8:
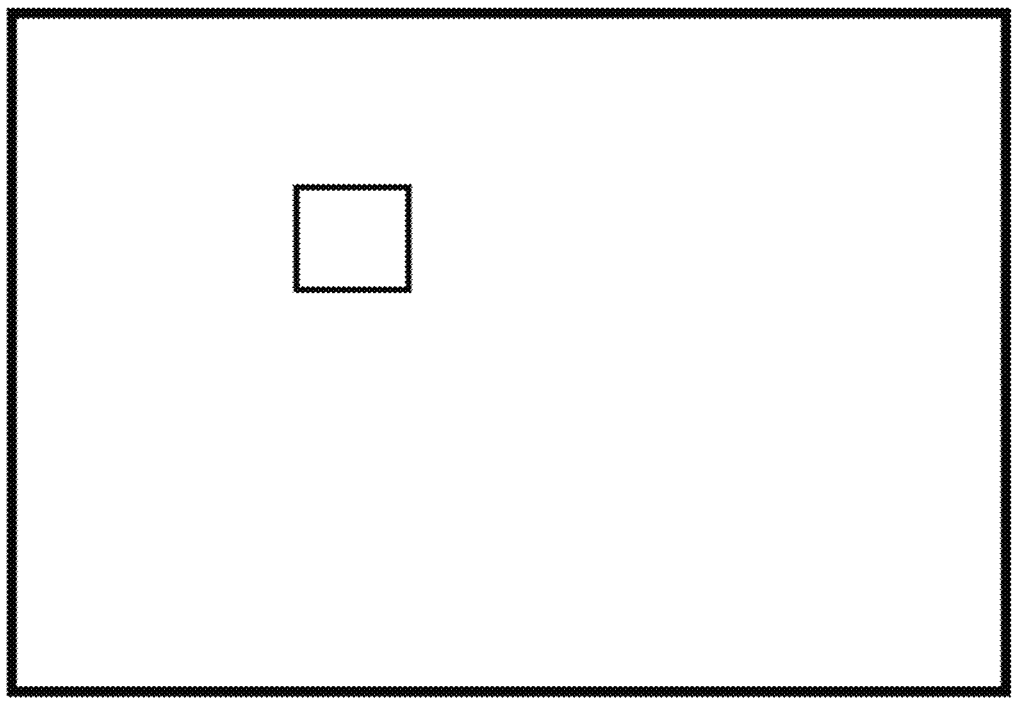
FIG. 8 shows an arrangement containing one square input area on a display generated by the game, in accordance with an embodiment.

In some embodiments, in addition to displays that singly contain a plurality of input areas, the sequence may contain one or more displays that singly contain only one input area. FIG. 8 shows an arrangement containing one square input area on a display generated by the game, in accordance with an embodiment. When the player touches the input area, he is presented with the next display in the sequence.

In some embodiments, the player may not be permitted to touch the screen outside of the presented input areas, and the game may prevent the player from proceeding to the next display until some or all of the input areas are simultaneously touched but the screen is not touched outside of the input areas; alternatively, the player may be penalized otherwise for touching the screen outside of the input areas, such as by losing points.

In alternate embodiments, input areas may vary in number, size, shape, texture, color, luminance, absolute position, relative position, and/or other features. Input areas may be indicated by images, videos, animations, shapes, patterns, colors, numbers, text, or other symbols, or any combination thereof. The indicators may be identical to each other, or they may differ in any of the aforementioned features; they may differ within a single display and/or across multiple displays. The selection of indicators for input areas may be predetermined or random. In some embodiments, indicators for input areas may be selected and/or customized according to user preferences. Likewise, arrangements of input areas and/or the respective positions of input areas within particular arrangements may be selected and/or customized according to user preferences. In some embodiments, the player may select which hand to use to touch the arrangements of input areas, causing the arrangements to be limited to those that can be touched by that hand without excessive strain. Other elements may be present in displays generated by the game. In some embodiments, the game may display content not related to the game mechanic described herein on the touchscreen of a computing device before, after, and/or between sequential displays containing arrangements of input areas.

In some embodiments, the game may store arrangements of input areas on a computer-readable storage medium as sets of coordinates in two-dimensional space. The game may use an absolute or a relative coordinate system or both. The coordinates of the respective input areas may be examined, stored, and utilized by the game in terms of absolute distances between them or in terms of their respective positions relative to a display generated by the game or the screen of the computing device in question. For example, the game may store and use absolute horizontal and vertical distances between the centers of particular input areas in an arrangement, or it may store and use these particular input areas' respective positions relative to the horizontal and vertical dimensions of the screen, or it may do both. Arrangements of input areas and other game elements, parameters, and instructions may be stored on players' computing devices or on a game server, which is configured to receive game commands from one or more clients over a network and to send game state information to networked computing devices of players. When an arrangement of input areas is displayed on a touchscreen of a computing device, each input area may be centered on a point defined by a stored set of coordinates. Additional parameters of input areas, such as shape, dimensions, velocity, color, and other parameters, may likewise be stored on and retrieved from a computer-readable storage medium. Aspects of the invention can be implemented using computer-executable instructions performed by a processor in a computing device equipped with a touchscreen, multiple such devices, or a game server.

In some embodiments, the game may reward the player for touching arrangements of input areas quickly; for example, the player may be given additional points, granted additional play time in a game session, and/or shown certain graphics. Specifically, the time period from the moment when an arrangement of input areas is displayed on the touchscreen of the player's computing device to the moment when the player simultaneously touches some or all of the presented input areas is examined. If this time period does not exceed a predetermined duration, then the player's touch is gauged to be fast, and he is rewarded. This duration may be fixed, or it may vary with the number of input areas in an arrangement and/or other parameters. For example, this duration may be longer for arrangements with more input areas, so the player has more time to touch them in a way that is gauged to be fast.

In some embodiments, the respective positions of input areas on a display may change in a predetermined or random manner. FIGS. 3A-3D show an example of a dynamic arrangement of input areas on a display generated by the game, wherein the input areas change their respective positions in a cyclical manner, in accordance with an embodiment. Circles 301 and 303 represent input areas. FIGS. 3A-3D show successive positions of the two input areas 301 and 303 with respect to each other and the display. Arrows 302 and 304 indicate the direction of motion of input areas 301 and 303 respectively from their current positions in FIGS. 3A-3D. The motion of the input areas may be continuous or intermittent, or they may change positions abruptly. In this example, the motion is cyclical, and input areas 301 and 303 return to their initial positions in FIG. 3A after reaching their positions in FIG. 3D.

FIGS. 4A-4D show another example of a dynamic arrangement of input areas on a display generated by the game, wherein the input areas change their respective positions in a cyclical manner, in accordance with an embodiment. Circles 401, 403, 405, and 407 represent input areas. FIGS. 4A-4D show successive positions of the four input areas 401, 403, 405, and 407 with respect to each other and the display. Arrows 402, 404, 406, and 408 indicate the direction of motion of input areas 401, 403, 405, and 407 respectively from their current positions in FIGS. 4A-4D. The motion of the input areas may be continuous or intermittent, or they may change positions abruptly. In this example, the motion is cyclical, and input areas 401, 403, 405, and 407 return to their initial positions in FIG. 4A after reaching their positions in FIG. 4D.

In alternate embodiments, the motion of input areas may not be cyclical or continuous. Input areas may stop after reaching their terminal positions rather than return to their initial positions. Alternatively, they may reverse their direction of motion and proceed backwards from their terminal positions to their initial positions; or they may abruptly change their respective positions from their terminal positions to their initial positions. The number of input areas and their speed and direction of motion may vary. The respective positions of input areas on a display may change continuously, intermittently, abruptly, and/or for a predetermined amount of time. Input areas may change in size, shape, texture, color, luminance, and/or other features as their respective positions change. Input areas may stop moving when they are touched by the player. In some embodiments, the respective speed and/or direction of motion of input areas may be selected and/or customized according to user preferences.

Figure 9A:
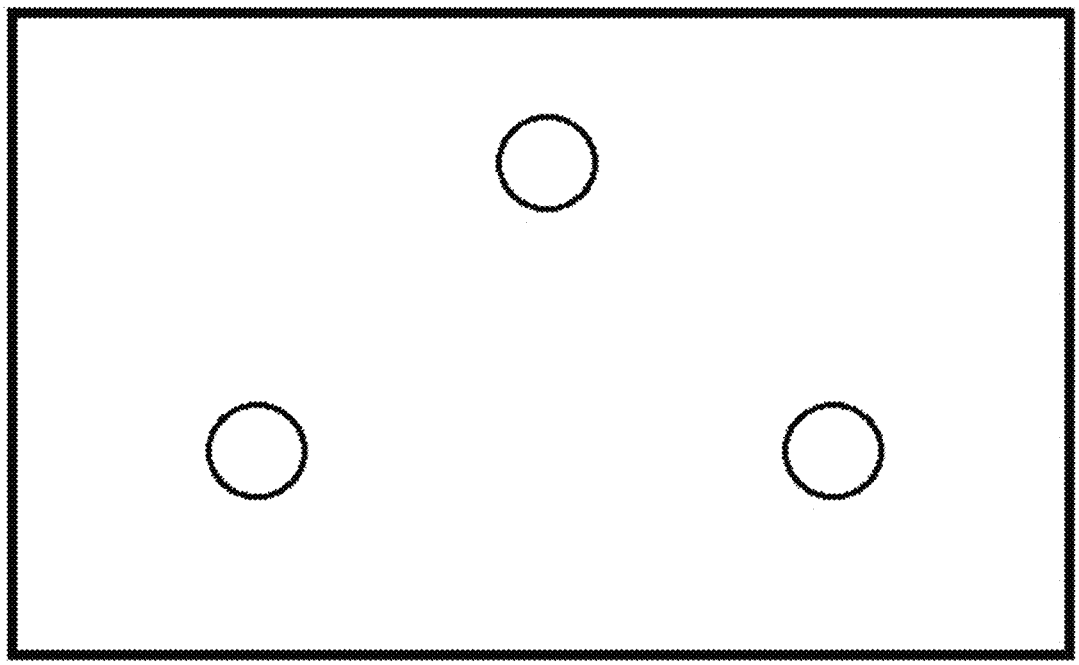
FIGS. 9A-9C show an example of a dynamic arrangement of input areas on a display generated by the game, wherein the input areas gradually increase in size, in accordance with various embodiments.
Figure 9B:
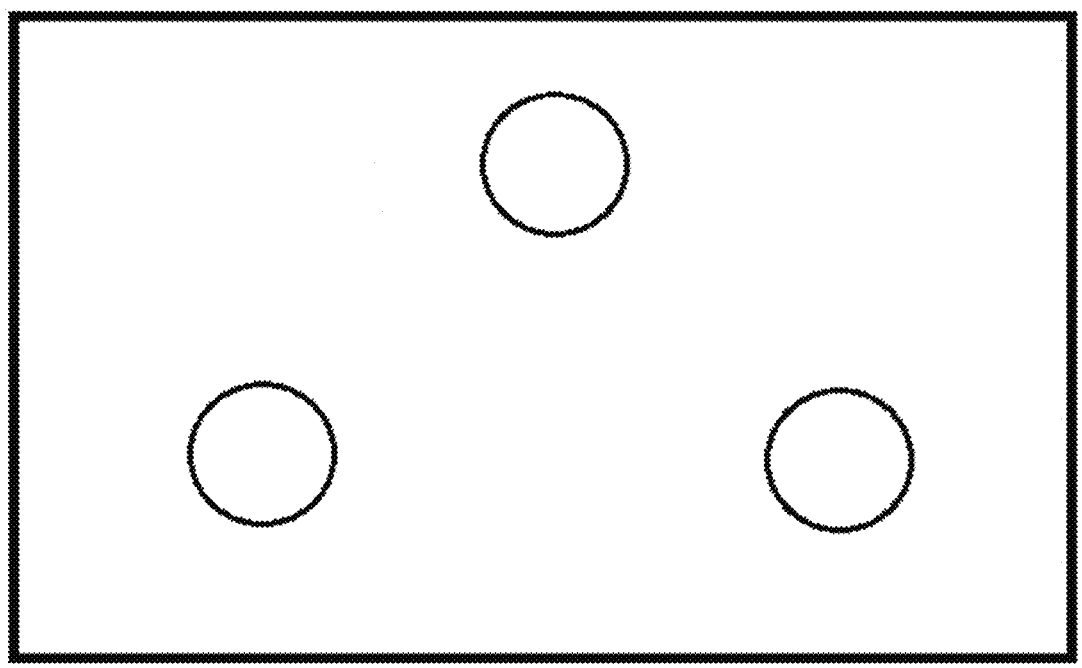
Figure 9C:
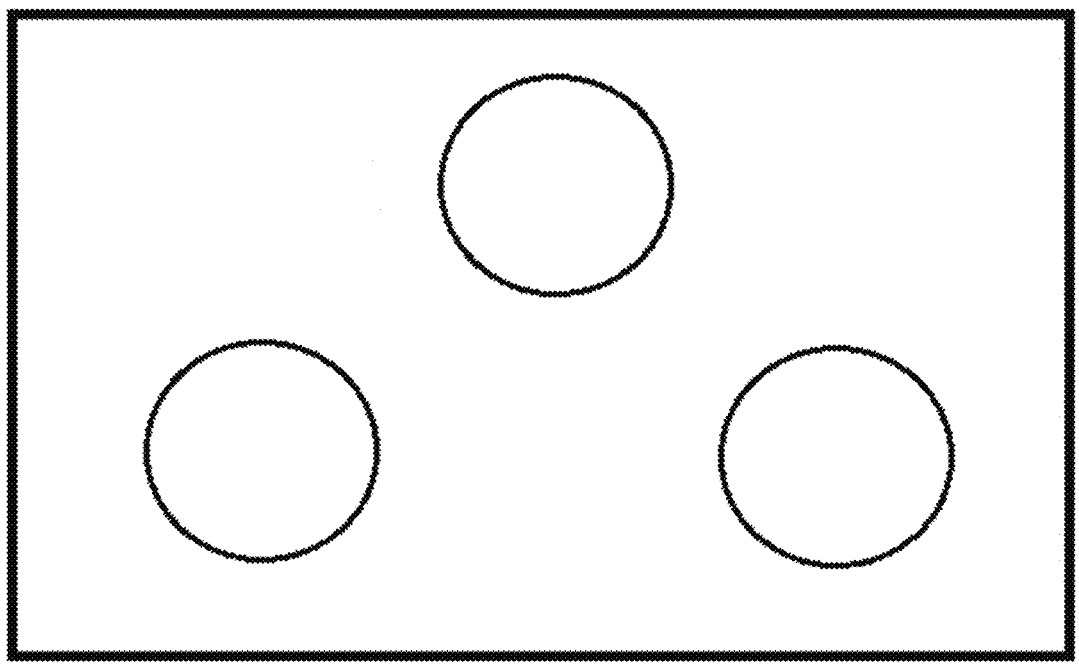

In some embodiments, the respective sizes of input areas on a display may change in a predetermined or random manner. For example, the respective sizes of input areas may gradually increase or decrease, or they may alternate between increasing and decreasing. FIGS. 9A-9C show an example of a dynamic arrangement of input areas on a display generated by the game, wherein the input areas gradually increase in size, in accordance with an embodiment. FIGS. 9A-9C represent three consecutive points in time, with time intervals between them, as the three circular input areas gradually get larger. In alternate embodiments, the number of input areas and their respective sizes may vary. The respective sizes of input areas on a display may change in different ways from each other; for example, some input areas may increase in size while other input areas decrease in size. The respective sizes of input areas on a display may change continuously, intermittently, abruptly, and/or for a predetermined amount of time. Alternatively, the sizes of input areas may change across a sequence of displays rather than within a single display. For example, the respective sizes of input areas may be static within a single display, but they may get progressively larger or smaller in subsequent displays. In another variation, the respective sizes of input areas on a display may be dynamic and may be preserved across consecutive displays. In such embodiments, the game may store the respective sizes of some or all input areas on a display when the player simultaneously touches some or all of the input areas to proceed to the next display. The game may then use these stored sizes to set the initial sizes of some or all input areas on the next display. Sizes of input areas may be stored as numbers or sets of numbers representing dimensions of the input areas. In some embodiments, dynamic input areas may stop changing in size when they are touched by the player. In some embodiments, the respective sizes of input areas may be selected and/or customized according to user preferences.

Figure 5A:
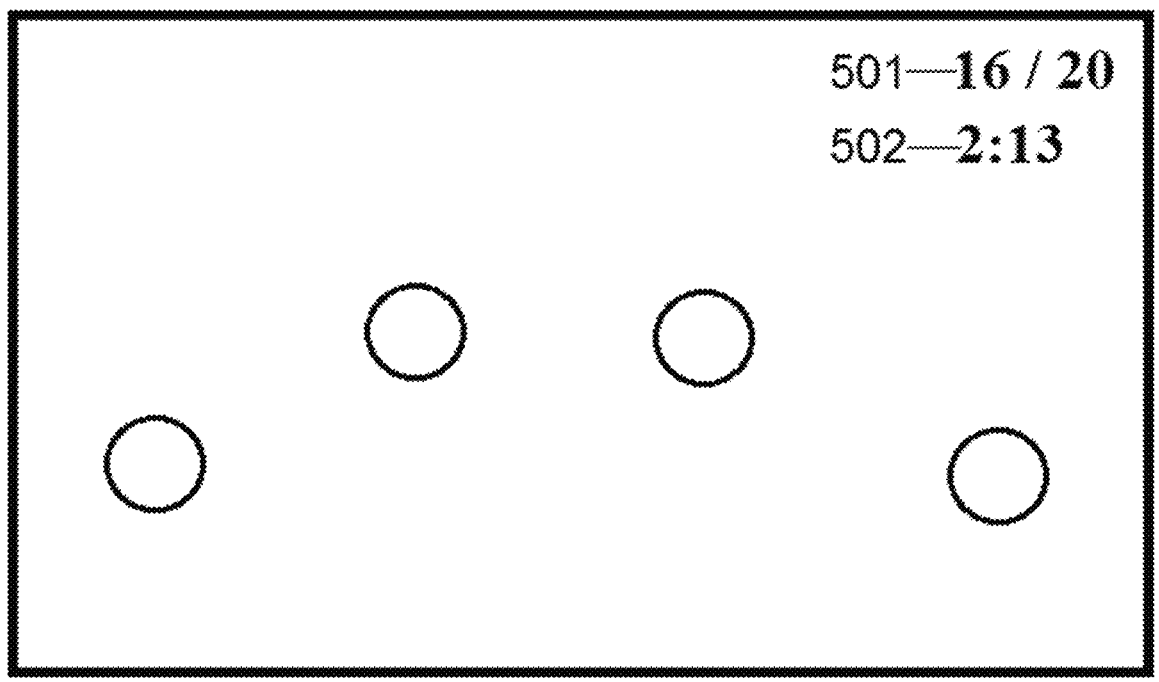
FIGS. 5A-5B show displays generated by the game in a mode wherein the player's objective is to touch a specified number of arrangements of input areas as quickly as possible, in accordance with various embodiments.
Figure 5B:
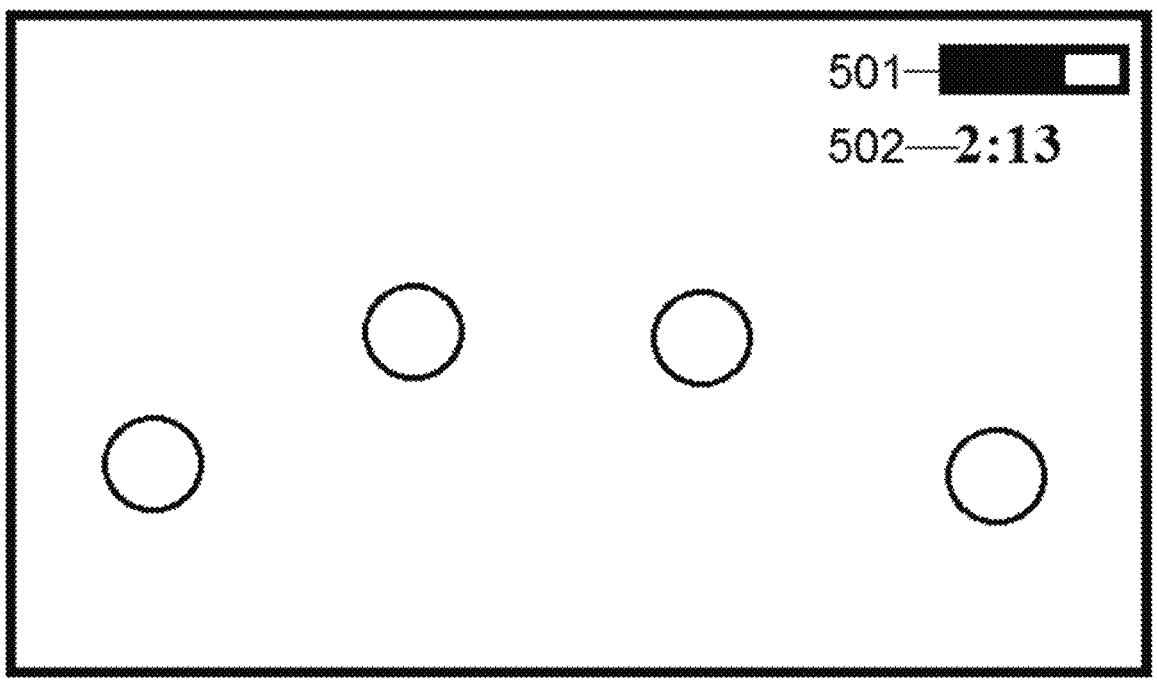

FIGS. 5A-5B show displays generated by the game in a mode wherein the player's objective is to touch a specified number of arrangements of input areas as quickly as possible, in accordance with various embodiments. In FIG. 5A, text 501 indicates the number of arrangements of input areas already touched out of the total number of arrangements to be touched, and text 502 indicates the time elapsed since the start of the game session. In FIG. 5B, progress bar 501 indicates the number of arrangements of input areas already touched out of the total number of arrangements to be touched, and text 502 indicates the time elapsed since the start of the game session.

In alternate embodiments, the number of arrangements of input areas already touched, the total number of arrangements to be touched, and/or the elapsed time may be indicated by text, a progress bar or a plurality of progress bars, the appearance of the input areas, the appearance of the background, aurally, and/or by other means, or no such indicators may be present. Other elements may be present. In some embodiments, this game mode may be omitted altogether.

Figure 6A:
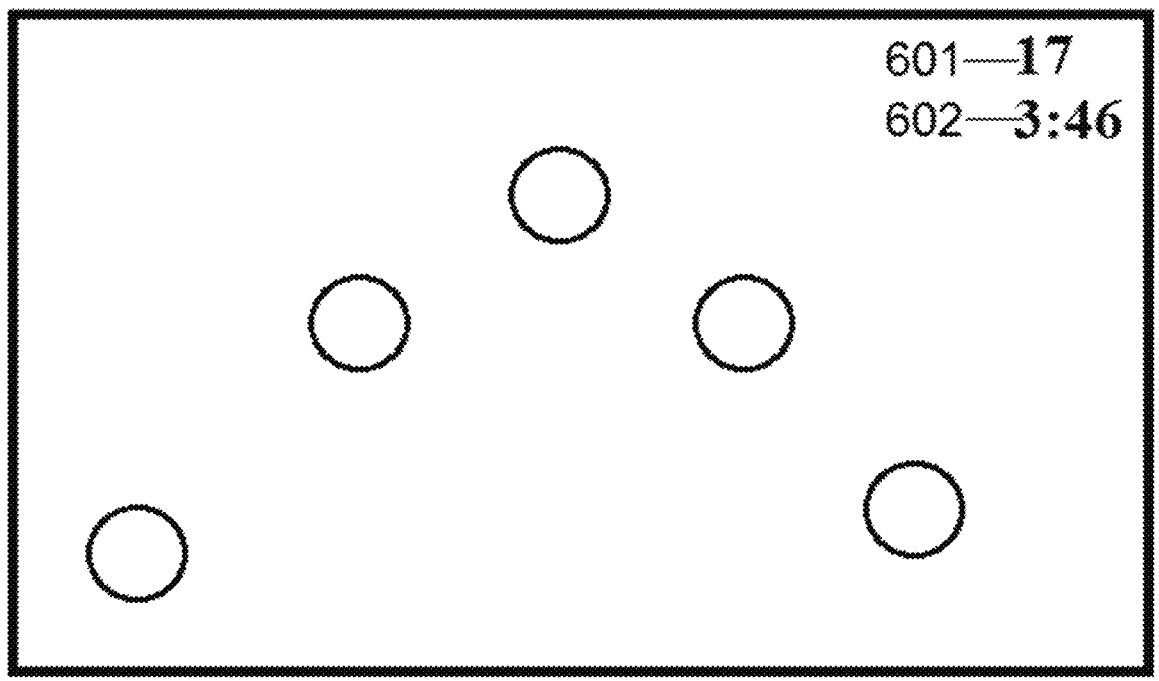
FIGS. 6A-6B show displays generated by the game in a mode wherein the player's objective is to touch as many arrangements of input areas as possible within a specified amount of time, in accordance with various embodiments.
Figure 6B:
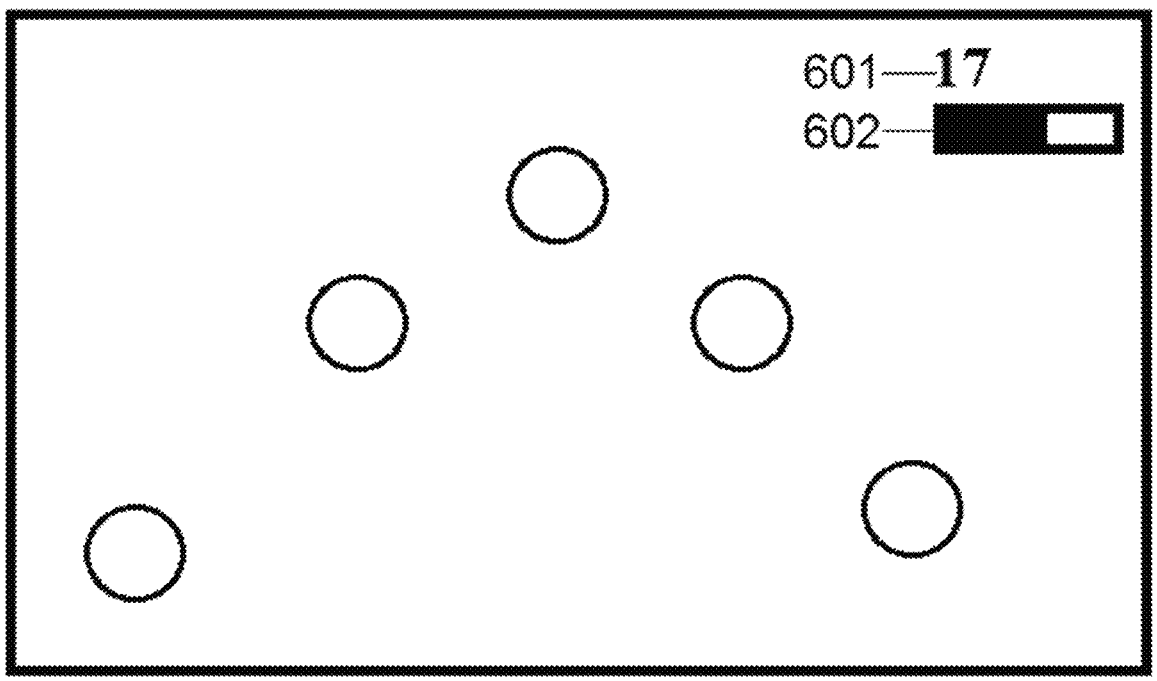

FIGS. 6A-6B show displays generated by the game in a mode wherein the player's objective is to touch as many arrangements of input areas as possible within a specified amount of time, in accordance with various embodiments. In FIG. 6A, number 601 indicates the number of arrangements of input areas already touched, and text 602 indicates the time remaining before the end of the game session. In FIG. 6B, number 601 indicates the number of arrangements of input areas already touched, and progress bar 602 indicates the time remaining before the end of the game session.

In some embodiments, touching an arrangement of input areas may increase the amount of time currently allotted to the player. The amount of additional time granted in a game session may depend on how quickly the player touches the arrangement of input areas.

In alternate embodiments, the number of arrangements of input areas already touched and/or the remaining time may be indicated by numbers, text, a progress bar or a plurality of progress bars, the appearance of the input areas, the appearance of the background, aurally, and/or by other means, or no such indicators may be present. Other elements may be present. In some embodiments, this game mode may be omitted altogether.

Some embodiments may contain a game mode wherein the player is allotted a predetermined amount of time to touch each respective arrangement of input areas. If the player fails to touch an arrangement of input areas within the specified time interval, the game ends or the player is otherwise penalized, such as by losing points. This time interval may remain constant, or it may gradually decrease, increase, or vary in another predetermined or random manner across a sequence of arrangements of input areas. The amount of time remaining for the player to touch an arrangement of input areas and/or the number of arrangements of input areas already touched by the player may be indicated by numbers, text, a progress bar or a plurality of progress bars, the appearance of the input areas, the appearance of the background, aurally, and/or by other means, or no such indicators may be present. Other elements may be present.

Some embodiments may contain a game mode wherein the touchscreens of networked computing devices of a plurality of players simultaneously display an arrangement of input areas, and each player's objective is to be the first of all the players to touch the displayed arrangement of input areas. The player that touches a displayed arrangement of input areas first wins that turn, and the computing devices of all the players simultaneously display the next arrangement of input areas. The arrangements of input areas presented to the respective players may be identical or different. The game may display a predetermined number of arrangements of input areas, or it may proceed for a predetermined amount of time. Alternatively, it may proceed indefinitely until the players terminate the game. The players may be ranked by the number of arrangements of input areas touched before the end of the game session. The numbers of arrangements of input areas already touched by the respective players, the total number of arrangements to be touched, the current ranking of the players, and/or the remaining time may be indicated by numbers, text, a progress bar or a plurality of progress bars, the appearance of the input areas, the appearance of the background, aurally, and/or by other means, or no such indicators may be present. Other elements may be present.

In some embodiments, this game mode may be implemented using a game server, which stores game state attributes and values and is configured to receive game commands from one or more clients over a network and to send game state information to networked computing devices of players. In such embodiments, the server concurrently sends a command to all the players' computing devices to display a particular arrangement of input areas. When they receive the command, the players' devices each display the arrangement in question on their touchscreens. When a player touches the arrangement of input areas on the touchscreen of his device, his device sends a message identifying said player to the server. When the server receives this message, it designates said player as the winner for this turn and sends a command to all the players' devices to display another particular arrangement of input areas, and so on.

Some embodiments may contain a game mode wherein the touchscreens of networked computing devices of a plurality of players each display a predetermined number of arrangements of input areas, and each player's objective is to touch this number of arrangements of input areas as quickly as possible. The sequences of arrangements of input areas presented to the respective players may be identical or different. The players may touch the sequences of arrangements of input areas simultaneously or in turn. The players may be ranked by the time taken to touch the specified number of arrangements of input areas. The numbers of arrangements of input areas already touched by the respective players, the total number of arrangements of input areas to be touched, the current ranking of the players, and/or the elapsed time may be indicated by numbers, text, a progress bar or a plurality of progress bars, the appearance of the input areas, the appearance of the background, aurally, and/or by other means, or no such indicators may be present. Other elements may be present.

In some embodiments, this game mode may be implemented using a game server, which stores game state attributes and values and is configured to receive game commands from one or more clients over a network and to send game state information to networked computing devices of players. In such embodiments, the server concurrently sends a command to all the players' computing devices to display a particular sequence of arrangements of input areas. When they receive the command, the players' devices each display the first arrangement in the sequence on their touchscreens. When a player touches all the arrangements in the sequence on the touchscreen of his device, his device sends a message identifying said player to the server. When the server receives this message, it designates said player as the winner for this game and sends a message identifying the game's winner to all the players' devices. Alternatively, the players may touch the sequences of arrangements of input areas at different times rather than simultaneously. In this case, their respective devices communicate to the server the amount of time taken by the player to touch all the arrangements in the sequence along with said player's identity. The server then decides the game's winner based on which player took the least time to touch all the arrangements in the sequence. It then sends a message identifying the game's winner to all the players' devices.

Some embodiments may contain a game mode wherein the touchscreens of networked computing devices of a plurality of players each display a predetermined sequence of arrangements of input areas, and each player is allotted a predetermined amount of time to touch each respective arrangement of input areas. If a player fails to touch an arrangement of input areas within the specified time interval, he loses the game or is otherwise penalized, such as by losing points. The sequences of arrangements of input areas presented to the respective players may be identical or different. The players may touch the sequences of arrangements of input areas simultaneously or in turn. The game may proceed until all players have failed to touch an arrangement of input areas within the specified time interval. A game where the players touch the sequences of arrangements of input areas simultaneously may proceed until all players except one have failed to touch an arrangement of input areas within the specified time interval, leaving the remaining player as the winner. Alternatively, the game may display a predetermined number of arrangements of input areas, or it may proceed for a predetermined amount of time; or it may proceed indefinitely until the players terminate the game. The players may be ranked by the number of arrangements of input areas touched before the end of the game session. The amount of time allotted to each player to touch an arrangement of input areas may remain constant or it may gradually decrease, increase, or vary in another predetermined or random manner across a sequence of arrangements of input areas. The amount of time remaining for a player to touch an arrangement of input areas and/or the numbers of arrangements of input areas already touched by the respective players may be indicated by numbers, text, a progress bar or a plurality of progress bars, the appearance of the input areas, the appearance of the background, aurally, and/or by other means, or no such indicators may be present. Other elements may be present.

In some embodiments, this game mode may be implemented using a game server, which stores game state attributes and values and is configured to receive game commands from one or more clients over a network and to send game state information to networked computing devices of players. In such embodiments, the server concurrently sends a command to all the players' computing devices to display a predetermined sequence of arrangements of input areas. When they receive the command, the players' devices each display the first arrangement in the sequence on their touchscreens. Each player is allotted a predetermined amount of time to touch each respective arrangement of input areas. When the allotted time expires and a player thus fails to touch an arrangement of input areas, the player's device sends a message identifying said player to the server. The server may then designate said player as a loser of this game, unless said player is the sole remaining player (the only player who has not been designated as a loser of this game), in which case, the server may designate said player as the winner of this game and send a message identifying the game's winner to all the players' devices. Alternatively, the players may touch arrangements of input areas at different times rather than simultaneously. In this case, their respective devices communicate to the server the number of arrangements of input areas touched by the player within the respective allotted time interval along with said player's identity. The server then decides the game's winner based on which player touched the most arrangements of input areas. It then sends a message identifying the game's winner to all the players' devices.

Some embodiments may contain a game mode wherein arrangements of input areas are displayed on a touchscreen of a networked computing device and are based on locations of touches on a touchscreen of another networked computing device. A player may thus generate arrangements of input areas for another player to touch, and a plurality of players may take turns matching each other's touch locations. For example, in a game involving two players, the first player touches the screen of his computing device with his fingers at particular locations. This arrangement of touch locations is then stored, sent to the second player's computing device, and displayed on its screen as an arrangement of input areas. The second player then attempts to touch this arrangement of input areas as quickly as possible. He then touches the screen of his computing device at particular locations to generate a corresponding arrangement of input areas for the first player, who then attempts to touch this arrangement as quickly as possible and afterward generates another arrangement of input areas for the second player, and so on. Alternatively, a player may generate multiple consecutive arrangements of input areas for another player. In another variation, only one player may generate arrangements of input areas in a game session, and/or only one player may receive and touch arrangements of input areas in a game session. There may be a limit on the number of input areas that an arrangement can contain. The game may allow a predetermined number of arrangements of input areas, or it may proceed for a predetermined amount of time. Alternatively, it may proceed indefinitely until the players terminate the game. In some embodiments, the players may be ranked by the total time taken to touch all the arrangements of input areas or by the average time taken to touch an arrangement of input areas.

In a game involving more than two players, this sequence of receiving an arrangement of input areas, touching it, and then touching the screen at particular locations to generate an arrangement of input areas for another player may proceed in a circle. For example, with three players, the first player generates an arrangement of input areas for the second player, who in turn generates an arrangement of input areas for the third player, who then generates an arrangement of input areas for the first player, and so on. Alternatively, the sender-receiver pairs may be selected in another predetermined way or randomly. In another variation, a plurality of players simultaneously receive an arrangement of input areas from a particular player, and the first player to touch this arrangement then generates an arrangement of input areas for the other players; alternatively, the sequence of players chosen to generate an arrangement of input areas for the other players may be predetermined or random.

Figure 7A:
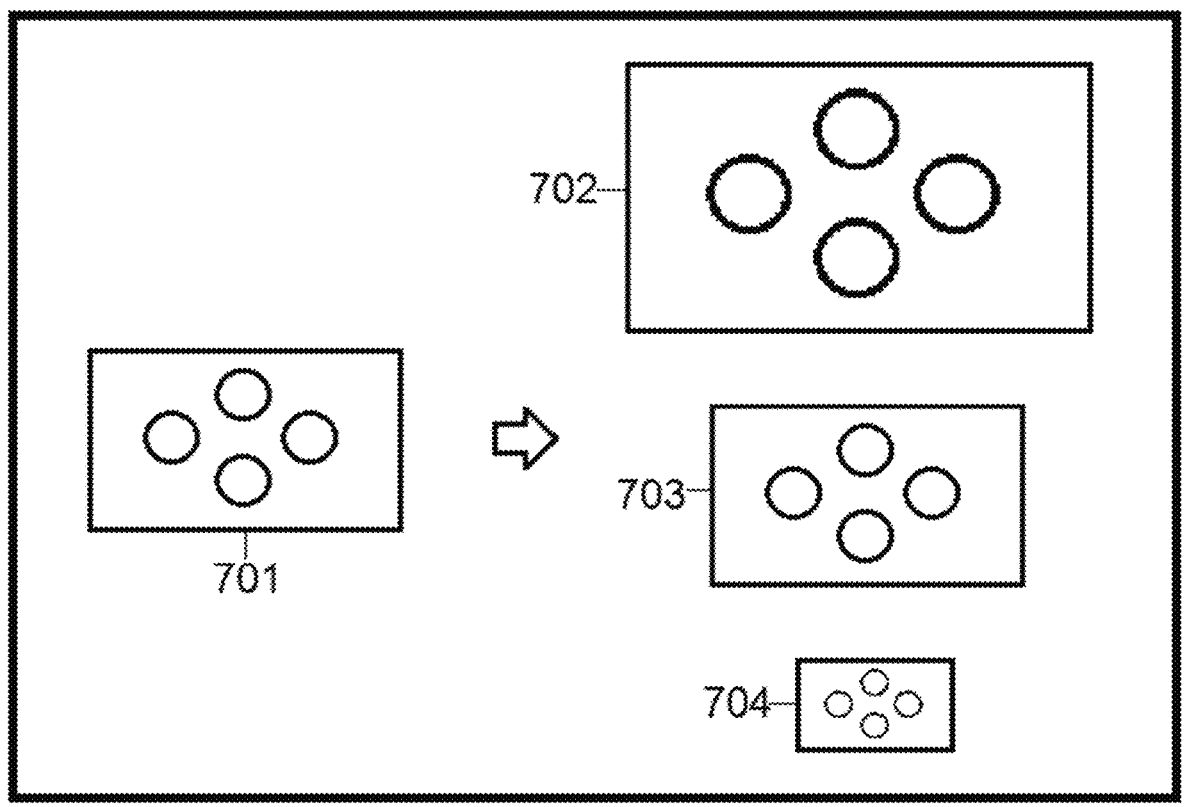
FIGS. 7A-7B show displays generated by the game on screens of various sizes in a mode wherein arrangements of input areas are displayed on a touchscreen of a networked computing device and are based on locations of touches on a touchscreen of another networked computing device, in accordance with various embodiments.
Figure 7B:
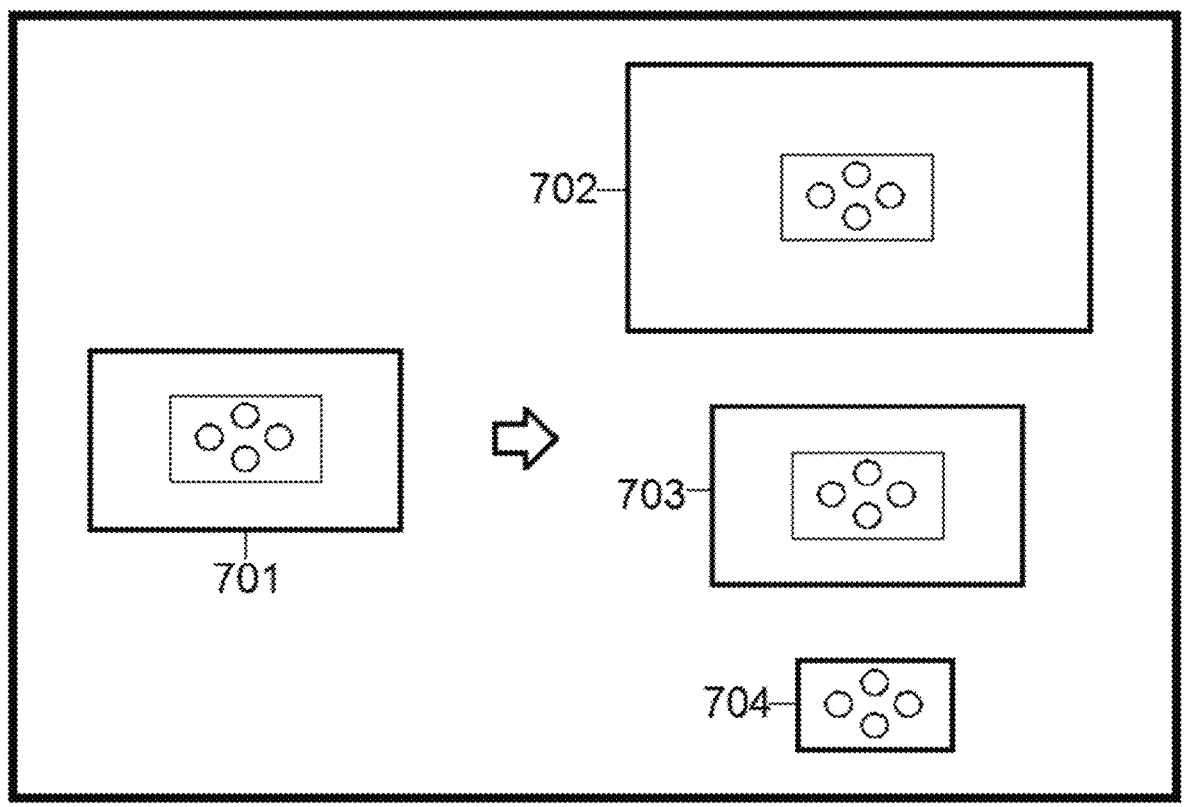

The absolute distances between touch locations in an arrangement of touch locations may be preserved, or its corresponding arrangement of input areas may be shrunk or enlarged to accommodate the screen of the computing device of the receiving player. Alternatively, the play area on the screens of the computing devices of all the players may be restricted to the size of the smallest screen present in order to always preserve absolute distances between touch locations in an arrangement of touch locations when it is displayed as an arrangement of input areas on the screen of the receiving player. FIGS. 7A-7B illustrate both approaches, in accordance with various embodiments. In FIGS. 7A-7B, image 701 represents the screen of a player who touched the screen of his computing device at four locations to generate the displayed arrangement of touch locations; the centers of the four circles signify the respective coordinates of the four touch locations. This arrangement of four touch locations is then stored as a set of coordinates in two-dimensional space, sent to the computing devices of three other players, and displayed on their screens as an arrangement of input areas. Images 702, 703, and 704 represent the screens of the computing devices of these three receiving players; these screens vary in size. In FIG. 7A, the absolute distances between touch locations in the arrangement of touch locations are preserved on screen 703, which is the same size as the screen of the sending player 701; they are increased on screen 702, which is larger than screen 701; and they are decreased on screen 704, which is smaller than screen 701. In this example, the size of the input areas varies with the screen size. In alternate embodiments, the size of the input areas may be fixed, and only the distances between input areas in an arrangement of input areas may vary. In FIG. 7B, the play area on the screens of the computing devices of all four players 701, 702, 703, and 704 is restricted to the size of the smallest screen present, 704, and the absolute distances between touch locations in the arrangement of touch locations are preserved when it is displayed as an arrangement of input areas on the screens of all three receiving players 702, 703, and 704. The game may use an absolute or a relative coordinate system or both. The coordinates of the respective touch locations and input areas based on these touch locations may be examined, stored, and utilized by the game in terms of absolute distances between them or in terms of their respective positions relative to a display generated by the game or the screen of the computing device in question. For example, the game may store absolute horizontal and vertical distances between the centers of particular touch locations in an arrangement of touch locations and replicate these distances in the corresponding arrangement of input areas; or it may store these particular touch locations' respective positions relative to the horizontal and vertical dimensions of the screen and replicate these positions relative to the screen in the corresponding arrangement of input areas; or it may do both.

In alternate embodiments, touch locations and/or input areas based on touch locations may vary in number, size, shape, texture, color, luminance, absolute position, relative position, and/or other features. Touch locations and/or input areas based on touch locations may be indicated by images, videos, animations, shapes, patterns, colors, numbers, text, or other symbols, or any combination thereof. The indicators may be identical to each other, or they may differ in any of the aforementioned features; they may differ within a single display and/or across multiple displays. The selection of indicators for touch locations and/or input areas based on touch locations may be predetermined or random. Indicators for touch locations may be absent. The respective sizes of input areas based on touch locations may be static, or they may change in a predetermined or random manner. For example, they may gradually increase or decrease. In some embodiments, indicators for touch locations and/or input areas based on touch locations may be selected and/or customized according to user preferences. Other elements may be present.

In some embodiments, dynamic arrangements of input areas may be generated by a player by touching the screen of his computing device at multiple locations for a particular input area, so that when the arrangement of touch locations is displayed as an arrangement of input areas on the screen of the receiving player, the input area in question moves between the multiple positions corresponding to the multiple touch locations in question. The motion of input areas may be cyclical, or an input area may reverse direction and proceed backwards after reaching the last position corresponding to a touch location. Alternatively, an input area may stop after reaching the last position corresponding to a touch location. The respective positions of input areas on a display may change continuously, intermittently, abruptly, and/or for a predetermined amount of time. Input areas may stop moving when they are touched by the player.

In some embodiments, a player may be allotted a predetermined amount of time to touch each respective arrangement of input areas that is generated by another player; if the player fails to touch an arrangement of input areas within the specified time interval, he loses the game or is otherwise penalized, such as by losing points. The amount of time allotted to each player to touch an arrangement of input areas may remain constant, or it may gradually decrease, increase, or vary in another predetermined or random manner across a sequence of arrangements of input areas. The game may proceed until all players except one have failed to touch an arrangement of input areas within the specified time interval, leaving the remaining player as the winner. Alternatively, the game may allow a predetermined number of arrangements of input areas, or it may proceed for a predetermined amount of time; or it may proceed indefinitely until the players terminate the game. The players may be ranked by the number of arrangements of input areas touched before the end of the game session. The amount of time remaining for a player to touch an arrangement of input areas and/or the numbers of arrangements of input areas already touched by the respective players may be indicated by numbers, text, a progress bar or a plurality of progress bars, the appearance of the input areas, the appearance of the background, aurally, or by other means, or no such indicators may be present. Other elements may be present.

In some embodiments, this game mode may be implemented using a game server, which stores game state attributes and values and is configured to receive game commands from one or more clients over a network and to send game state information to networked computing devices of players. In such embodiments, the first player touches the touchscreen of his computing device with his fingers at particular locations. His device then sends this arrangement of touch locations to the server as a set of coordinates in two-dimensional space. In a two-player game, the server then sends a command to the second player's computing device to display this arrangement of touch locations as an arrangement of input areas. In a game involving more than two players, the server concurrently sends a command to multiple players' computing devices to display this arrangement of touch locations as an arrangement of input areas. The receiving player's device or multiple receiving players' devices then display this arrangement of touch locations as an arrangement of input areas on their respective touchscreens. In some embodiments, when a player touches this arrangement of input areas, his device may send a message identifying said player to the server. In embodiments where a player is allotted a predetermined amount of time to touch each respective arrangement of input areas that is generated by another player, when the allotted time expires and a player thus fails to touch an arrangement of input areas, the player's device may send a message identifying said player to the server. The server may rank the players by the number of arrangements of input areas touched before the end of the game session and send a message identifying the game's winner to all the players' devices.

I claim:

1. A method for playing an electronic game testing manual dexterity and/or reaction time of a player, comprising a sequence of two or more displays on a touchscreen of a computing device with multi-touch functionality, wherein:
   the displays singly contain a plurality of input areas arranged in a two-dimensional space, all of which must be touched simultaneously by the player to proceed to the next display of the electronic game; and
   the electronic game automatically rewards the player with additional points, additional play time in a game session, and/or a display of graphics, the display of graphics indicating a touching of the input areas by the player and/or a progression by the player to the next display of the electronic game, when the player touches one or more arrangements of the input areas quickly based on a time period from the moment when the touchscreen of the computing device displays an arrangement of the input areas to the moment when the player simultaneously touches all of the input areas, wherein:
      the time period does not exceed a predetermined duration, wherein the predetermined duration is five seconds or less, and/or
      a combined duration of two or more time periods from the sequence of two or more displays does not exceed a predetermined threshold, wherein the predetermined threshold is five seconds or less multiplied by the number of the time periods.

2. The method of claim 1, wherein the game prevents the player from proceeding to the next display until all of the input areas are touched simultaneously and the touchscreen is not touched outside of the input areas.

3. The method of claim 1, wherein the respective positions of one or more of the input areas on a display change in a predetermined or random manner.

4. The method of claim 1, wherein the respective sizes of one or more of the input areas on a display change in a predetermined or random manner.

5. The method of claim 1, wherein the player's objective is to touch a specified number of arrangements of the input areas as quickly as possible and/or within a predetermined time period.

6. The method of claim 1, wherein the player's objective is to touch a predetermined number of arrangements of the input areas and/or as many arrangements of the input areas as possible within a predetermined amount of time.

7. The method of claim 6, wherein touching one or more arrangements of the input areas increases the amount of time currently allotted to the player.

8. The method of claim 1, wherein the player is allotted a predetermined amount of time to touch each respective arrangement of the input areas and/or the player is allotted a predetermined amount of time to touch a plurality of arrangements of the input areas.

9. A non-transitory computer-readable storage medium storing thereon computer-executable instructions for playing an electronic game testing manual dexterity and/or reaction time of a player, the instructions, when executed by a processor, configure the processor to show a sequence of two or more displays on a touchscreen of a computing device with multi-touch functionality, wherein:
   the displays singly contain a plurality of input areas arranged in a two-dimensional space, all of which must be touched simultaneously by the player to proceed to the next display of the electronic game; and the electronic game automatically rewards the player with additional points, additional play time in a game session, and/or a display of graphics, the display of graphics indicating a touching of the input areas by the player and/or a progression by the player to the next display of the electronic game, when the player touches one or more arrangements of the input areas quickly based on a time period from the moment when the touchscreen of the computing device displays an arrangement of the input areas to the moment when the player simultaneously touches all of the input areas, wherein:

the time period does not exceed a predetermined duration, wherein the predetermined duration is five seconds or less, and/or a combined duration of two or more time periods from the sequence of two or more displays does not exceed a predetermined threshold, wherein the predetermined threshold is five seconds or less multiplied by the number of the time periods.

10. The non-transitory computer-readable storage medium of claim 9, wherein the game prevents the player from proceeding to the next display until all of the input areas are touched simultaneously and the touchscreen is not touched outside of the input areas.

11. The non-transitory computer-readable storage medium of claim 9, wherein the respective positions of one or more of the input areas on a display change in a predetermined or random manner.

12. The non-transitory computer-readable storage medium of claim 9, wherein the respective sizes of one or more of the input areas on a display change in a predetermined or random manner.

13. A method for playing a multiplayer electronic game testing manual dexterity and/or reaction time of players, comprising sequences of displays on touchscreens of two or more networked computing devices with multi-touch functionality, wherein:

the displays singly contain a plurality of input areas arranged in a two-dimensional space, all of which must be touched simultaneously by a player to proceed to the next display of the electronic game;

one or more players' objective is to touch one or more displayed arrangements of the input areas faster than one or more other players, as quickly as possible, and/or within a predetermined amount of time; and one or more of the following:

one or more graphical displays shown to one or more players, the one or more graphical displays indicating information pertaining to the electronic game, one or more players' score, one or more players' rank, and/or a determination of the winner of the game is based, in part or in full, on the duration of a time period from the moment when a touchscreen of a networked computing device displays an arrangement of the input areas to the moment when a player simultaneously touches all of the input areas and/or on the combined duration of a plurality of the time periods.

14. The method of claim 13, wherein the touchscreens of networked computing devices of a plurality of players simultaneously display an arrangement of the input areas, and each player's objective is to be the first of all the players to touch the displayed arrangement of the input areas.

15. The method of claim 13, wherein the touchscreens of networked computing devices of a plurality of players each display a predetermined number of arrangements of the input areas, and each player's objective is to touch the predetermined number of arrangements of the input areas as quickly as possible and/or faster than one or more other players.

16. The method of claim 13, wherein the touchscreens of networked computing devices of a plurality of players each display a predetermined sequence of arrangements of the input areas, and each player is allotted a predetermined amount of time to touch each respective arrangement of the input areas and/or each player is allotted a predetermined amount of time to touch a plurality of arrangements of the input areas.

17. The method of claim 13, wherein arrangements of the input areas are displayed on a touchscreen of a networked computing device and are based on locations of touches on a touchscreen of another networked computing device.

18. The method of claim 17, wherein a player is allotted a predetermined amount of time to touch each respective arrangement of the input areas and/or a player is allotted a predetermined amount of time to touch a plurality of arrangements of the input areas.

19. The method of claim 1, wherein the electronic game incorporates a multiplayer mode testing manual dexterity and/or reaction time of players, comprising sequences of the two or more displays on touchscreens of two or more networked computing devices with multi-touch functionality.

20. The method of claim 1, wherein arrangements of the input areas are displayed on a touchscreen of a networked computing device and are based on locations of touches on a touchscreen of another networked computing device.

* * * * *